United States Patent [19]

Schmidt

[11] Patent Number: 4,476,849
[45] Date of Patent: Oct. 16, 1984

[54] OUTDOOR GRILL BREATHER

[76] Inventor: Anthony J. Schmidt, 2779 Fairlane Ave., Waterloo, Iowa 50702

[21] Appl. No.: 500,169

[22] Filed: Jun. 1, 1983

[51] Int. Cl.³ ............................................. F24B 3/00
[52] U.S. Cl. .............................. 126/25 R; 126/41 R; 292/338; 248/200.1
[58] Field of Search ..................... 126/9 R, 9 B, 25 A, 126/25 AA, 25 R, 25 B, 25 C, 41 R; 217/60 B, 60 R, 61; 220/85 CH; 292/288, 338, 339, 342; 248/351, 356, 354 R, 354 P; 16/110, 113

[56] References Cited

U.S. PATENT DOCUMENTS

| | | | |
|---|---|---|---|
| 880,106 | 2/1908 | Shimek | 126/41 R |
| 1,669,852 | 5/1928 | Britton | 126/9 R |
| 2,520,578 | 8/1950 | Treloar | 126/25 R |
| 2,541,528 | 2/1951 | McAvoy | 126/25 A |
| 2,792,773 | 5/1957 | Barker | 126/9 R |
| 3,274,987 | 9/1966 | Hastings | 126/9 R |
| 3,320,942 | 5/1967 | Christensen | 126/25 R |
| 3,834,745 | 9/1974 | Coates | 126/9 B |
| 4,192,283 | 3/1980 | Kridler et al. | 126/25 AA |
| 4,256,080 | 3/1981 | Seach | 126/25 R |
| 4,390,002 | 6/1983 | Daily | 126/25 R |

FOREIGN PATENT DOCUMENTS 584721  5/1932  Fed. Rep. of Germany .... 126/41 R

*Primary Examiner*—Margaret A. Focarino
*Attorney, Agent, or Firm*—Zarley, McKee, Thomte, Voorhees & Sease

[57] ABSTRACT

The grill breather device of the present invention is used on an outdoor grill to prop open the hinged lid of the grill so as to provide oxygen to the interior of the grill when food is being cooked thereon. Additional oxygen prevents flame flare-up caused by the dripping of excess fat from the meat. The device generally comprises an arm having perpendicular legs secured along the length thereof and a knob for controlling the position of the arm. The lid of the grill is supported by any one of the legs so that it is open to the desired height.

6 Claims, 7 Drawing Figures

OUTDOOR GRILL BREATHER

BACKGROUND OF THE INVENTION

Outdoor grills, including both the charcoal and gas varieties, are popular for cooking foods, particularly meat. One problem that arises in cooking on a grill is that the fat from steak, chicken, pork, or any other meat with excess fat, oftentimes drips down into the grill and causes a flame that burns the meat. However, the dripping fat also produces the charcoal flavor associated with meat cooked in a charcoal or gas grill.

Therefore, a primary objective of the present invention is the provision of a device to hold the lid of the grill open so as to avoid flame-up from dripping fat.

A further objective of the present invention is the provision of a device for use in an outdoor grill that will permit the user to easily monitor the cooking of the meat.

A further objective of the present invention is the provision of a device that can be easily attached to an outdoor grill.

A further objective of the present invention is the provision of a device that is economical to manufacture and easy to use.

SUMMARY OF THE INVENTION

The grill breather device of the present invention comprises an arm having a plurality of perpendicular legs which hold the lid of a grill open at selected heights so as to prevent flame-up caused by the dripping of excess fat from meat being cooked on the grill. A knob is attached to the arm so that it can be moved from a horizontal position when not in use to an upright position whereby the lid can be held open. A spring located between the knob and the arm provides sufficient force to keep the arm in the upright position. The device can be easily attached to the lower portion of the grill by drilling a hole therethrough and bolting the knob and arm on opposite sides of the hole.

DETAILED DESCRIPTION OF THE DRAWINGS

Figure 1:
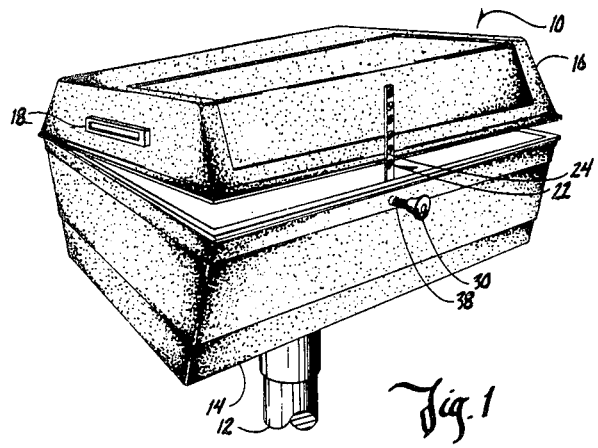
FIG. 1 is a perspective view of an outdoor grill with the lid partially propped open by the grill breather device.
Figure 2:
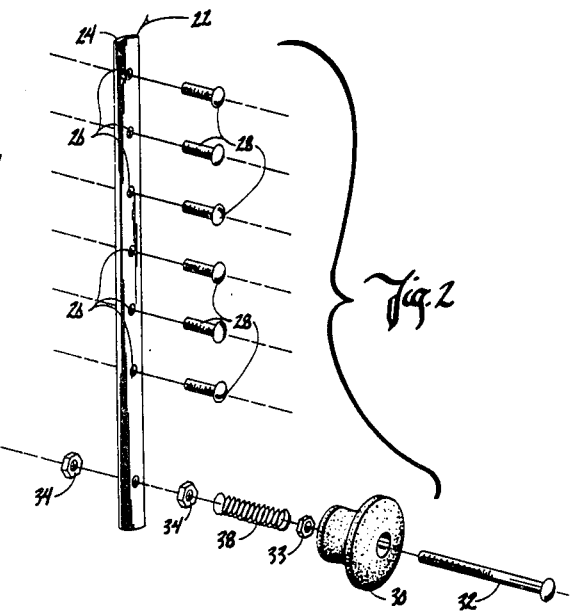
FIG. 2 is an exploded perspective view of the grill breather device.

An outdoor grill, of either the gas or charcoal variety, is generally designated by the numeral 10. Grill 10 is mounted upon a support 12 and includes a lower bin portion 14 for housing the charcoal brickettes or the gas pipes and a hinged lid 16 for covering lower bin 14. At least one handle 18 is attached to the lid so that it may be opened. A grate 20 fits inside lower bin 14 and is supported by a grate shelf 21.

The grill breather device of the present invention is generally designated by the numeral 22. Device 22 includes an arm 24 and a plurality of legs along the length of arm 24 and perpendicular thereto, such as bolts 28 which extend through holes 26. A knob 30 is secured to arm 24 via a long bolt 32 and nuts 34. Bolt 32 extends through a hole 36 in lower bin 14 such that knob 30 is on the outside of the grill and arm 24 is generally inside the grill. Nut 33 adjacent knob 30 maintains knob 30 in a rigid fashion on bolt 32.

Figure 4:
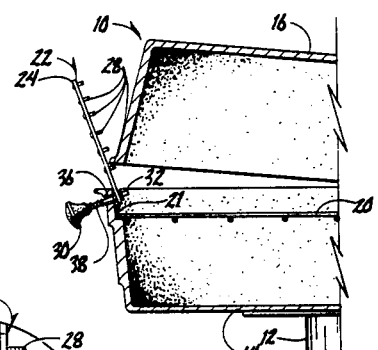
FIG. 4 is a partial sectional side elevation view of a grill with the lid partially propped open by the grill breather device.
Figure 7:
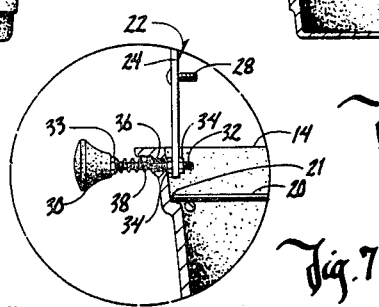
FIG. 7 is an enlarged view taken along line 7—7 of FIG. 6.
Figure 5:
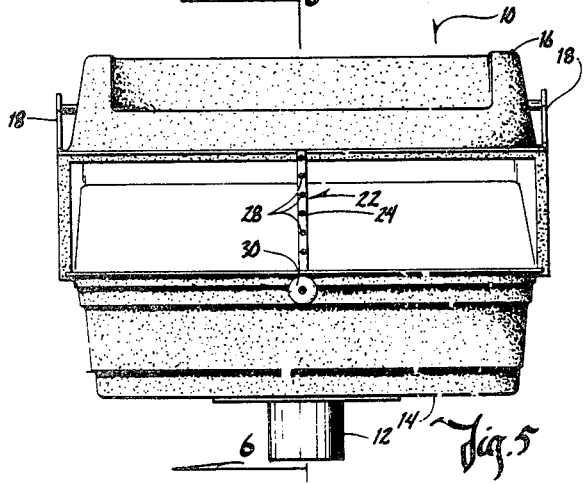
FIG. 5 is a front elevation view of an outdoor grill with the lid propped open to the greatest extent by the grill breather device.
Figure 6:
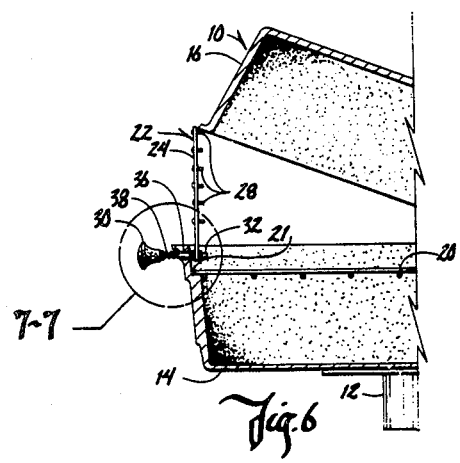
FIG. 6 is a partial sectional side elevation view of an outdoor grill with the lid propped open to the greatest extent by the grill breather device.

When in use, device 22 is generally in an upright position whereby one of the bolts 28 prop lid 16 open to a desired height. As seen in FIGS. 4, 6 and 7 there is sufficient play in hole 36 to permit breather device 22 to pivot inwardly and outwardly with respect to lid 16 such that lid 16 will be supported at a selected height by one of legs 28. The closer lid 16 is to be placed with respect to bin 14, the further outwardly device 22 must pivot in a vertical plane so that lid 16 will avoid engagement with legs 28 positioned above the corresponding desired leg. Conversely, device 22 must pivot inwardly in a vertical plane as lid 16 is raised further away from lower bin 14 so that one of the upper legs 28 will support lid 16. By adjusting the lid to the desired height, flame flare-up in the interior of the grill caused by dripping of excess fat from the cooking meat can be eliminated. The additional oxygen supplied to the interior of the grill when lid 16 is open helps prevent flame flare-up. Also, by having lid 16 partially open, the cooking progress of the meat can be easily checked. A spring 38 positioned on bolt 32 between knob 30 and the exterior of lower bin 14 exerts a sufficient force on arm 24 so as to keep it in the upright position when in use.

Device 22 can also be used when cooking lean meat without excess fat on a grill. By adjusting the height of the lid, the meat can be cooked at a higher temperature so that it will brown better to give it an enhanced charcoal flavor.

Figure 3:
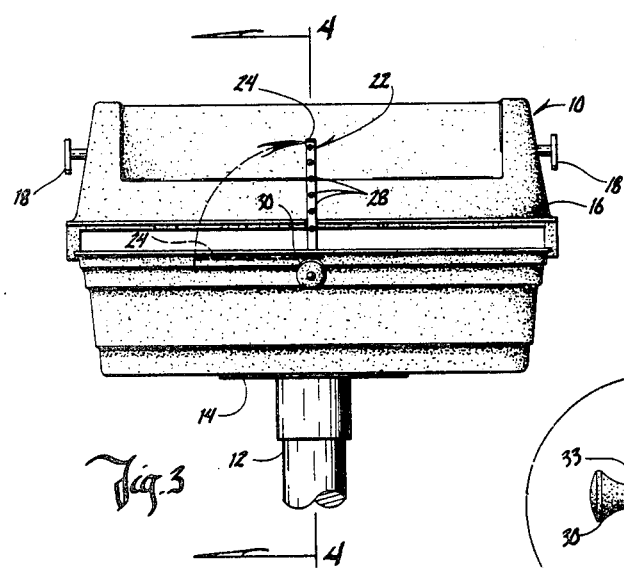
FIG. 3 is a front elevation view of a grill with the lid partially propped open by the grill breather device.

When not in use, knob 30 can be turned so that arm 24 is moved to a horizontal position and rests against grate shelf 21 so that lid 16 may be closed, as shown by the dotted lines in FIG. 3.

It is understood that legs 28 need not be bolts as shown in the drawings, but may be any other extension welded or otherwise attached to arm 24 or may be punched out of arm 24 without departing from the scope of the invention. It is also understood that grill breather device may be attached to lower bin 14 at any convenient place along the front or side edges thereof.

From the foregoing, it can be seen that the device of the present invention accomplishes at least all of the stated objectives.

What is claimed is:

1. A grill breather device for use on an outdoor grill for cooking food having a lower bin for housing charcoal briquettes or gas pipes and a hinged lid to cover the bin, comprising:

an arm pivotally connected to said grill and moveable between a first horizontal position and a second substantially vertical position, a plurality of legs attached perpendicularly to the arm, the arm being pivoted in a vertical plane inwardly and outwardly with respect to the lid of the grill such that one of the legs engages and props the lid at a selected height when the arm is in the second position, and a knob secured to the arm for changing the position of the arm.

2. The device according to claim 1 wherein the device is attached to the lower bin of the grill so that the knob is on the exterior of the grill and the arm is on the interior of the grill when in the horizontal position.

3. The device according to claim 1 further comprising a spring located between the arm and the knob for maintaining a force on said arm whereby the arm will remain in the vertical position.

4. A grill breather device for use on an outdoor grill for cooking food having a lower bin for housing charcoal briquettes or gas pipes and a hinged lid to cover the bin, comprising:

an upright arm pivotally attached to the grill and having spaced apart upper and lower ends, a plurality of legs secured perpendicularly to the arm along the length thereof, and a knob connected to the arm for manual control thereof, the arm being moveable between an upright operational position and a lowered non-operational position, the upper end of the arm being movable in a vertical plane toward and away from the lid such that the lid is supported at a selected height by one of the legs when the arm is in the upright position so as to maintain the desired cooking temperature.

5. The device of claim 4 wherein the arm can be moved to a horizontal position when the grill is not in use.

6. The device of claim 4 wherein the lower end of the arm is attached on the inside of the bin and the knob is located on the outside of the bin.

* * * * *